Feb. 14, 1956 R. H. BALL ET AL 2,734,585
JET-DRIVEN HELICOPTER ROTOR POWER PLANT CONTROL SYSTEM
Filed Nov. 28, 1950
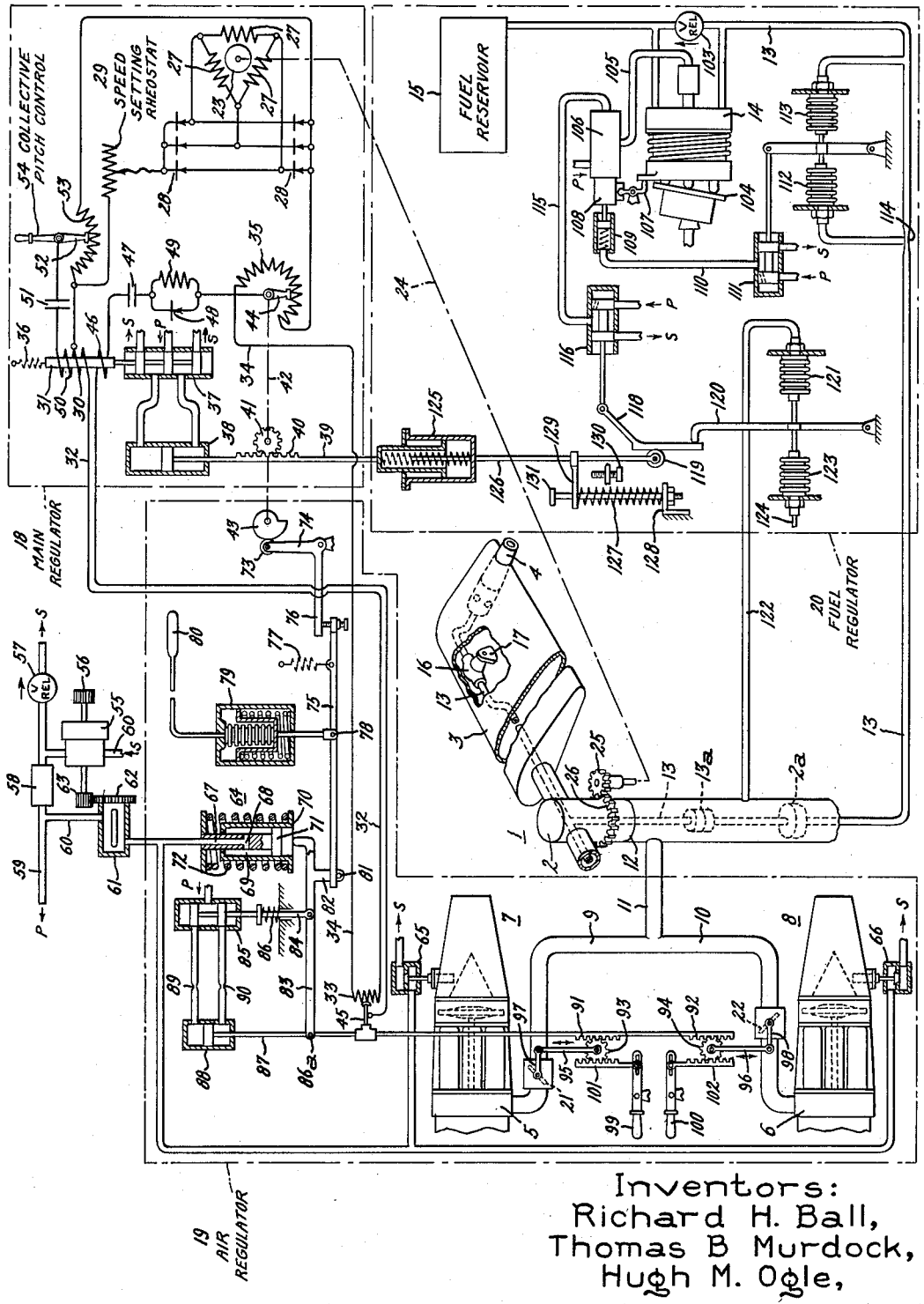
Inventors:
Richard H. Ball,
Thomas B Murdock,
Hugh M. Ogle,
by Claude A. Mott
Their Attorney.

United States Patent Office 2,734,585
Patented Feb. 14, 1956

2,734,585

JET-DRIVEN HELICOPTER ROTOR POWER PLANT CONTROL SYSTEM

Richard H. Ball, Schenectady, Thomas B. Murdock, Scotia, and Hugh M. Ogle, Schenectady, N. Y., assignors to General Electric Company, a corporation of New York Application November 28, 1950, Serial No. 198,015

14 Claims. (Cl. 170—135.4)

This invention relates to improved control systems for reaction motors or powerplants, and is particularly adapted for use with such powerplants employing separate compressors as a source of pre-compressed combustion air.

This invention will be described in connection with such powerplants which are employed to rotate a propeller or lifting rotor for aircraft, the reaction powerplants being located at or near the tips of the propeller or rotor blades to cause rotor rotation. In a powerplant of this description, the operation of the powerplant and the controls must obviously be dependable and foolproof, offering the maximum available performance and response to the operator's controls under varying load conditions without in any way risking damage or failure to the powerplant.

It is an object of this invention to provide an improved control system for thermal power plants It is a further object of this invention to provide a control which is particularly well adapted for use with reaction powerplants designed for incorporation into rotary wing aircraft rotor blades, which affords a maximum of performance with safety.

A convenient source of precompressed combustion air for such power plants is a gas turbine compressor. Such air may be bled from the compressor while allowing a certain portion to pass on through the gas turbine. In employing gas turbines as pre-compressors for reaction powerplants of the type here disclosed, it is important that a shift in the demand for compressed air shall not be imposed on the turbines too rapidly in order that reliable operation may be obtained and turbine damage avoided. It is also important that no less than a certain minimum of air be permitted to continue from the compressor through the gas turbine to prevent excessive turbine temperatures.

It is therefore another object of this invention to provide a control system for reaction powerplants of the above description employing gas turbine powerplants as a source of compressed air, which will limit the demand and the rate of change in the demand by the powerplants for compressed air when necessary to avoid improper gas turbine operation.

In carrying out this invention, therefore, the control may be applied to helicopters having reaction powerplants near the tips of the rotor blades, which may be conveniently designated "tip jets," and employing gas turbines as a source of precompressed combustion air. The amount of air and fuel which is supplied to the tip jets may be regulated by the control system in response to the rotor speed in order to maintain a predetermined presettable speed. The amount of fuel and air may be momentarily increased or decreased upon an increase or decrease respectively in the collective pitch control of the helicopter which changes the pitch of all the rotor blades at once. Additionally, the rates of change of both the air and fuel are controllable in response to movements of both the speed governing system and of an air regulating system. The tip jet air may also be limited in accordance with both the ambient temperature and a maximum limiting temperature of the gas turbines. Likewise, the fuel may be controlled in accordance with the pressure or flow rate of the precompressed air supplied to the tip jets.

For a more complete understanding of the invention, reference should be made to the following specification and the accompanying drawing which is a schematic diagram of a control system and powerplant incorporating this invention.

Referring more particularly to the drawing, there is shown a helicopter rotor 1 having a hollow rotor hub 2. For purposes of clarity, only one rotor blade 3 is shown, but a helicopter incorporating this invention would preferably have two or more rotor blades of substantially identical construction. Each rotor blade, as shown in blade 3, is equipped with a tip jet 4. Compressed air is supplied to the tip jets from the compressors 5 and 6 of gas turbine powerplants 7 and 8 through suitable ducts 9, 10, and 11 and through the hollow rotor hub 2 and the open interior of rotor blade 3. If desired, special ducts (not shown) may be employed within the rotor blade 3 to convey this compressed air. Hub 2 includes a seal at 12 between the upper rotatable portion and the lower non-rotatable portion of hub 2. A sealing plug 2a may be provided to prevent escape of air at the bottom of the hub. Fuel may be supplied for combustion at the tip jet 4 through a fuel duct 13, pressurized by a variable displacement fuel pump 14 from a suitable fuel reservoir 15. A suitable leak-proof joint 13a may be provided between the upper rotatable, and the lower non-rotatable portions of duct 13. In order to counteract changes in fuel pressure at the tip jet 4 due to the centrifugal force of rotation of the rotor blade, a suitable centrifugal force responsive flow limiting valve 16 may be provided in the fuel line which may employ a centrifugal force responsive element such as a pivoted off-center weight 17.

For convenience in the explanation of the structure and operation of the control system of this invention, the system will be described in terms of a main regulator 18, an air regulator 19 and a fuel regulator 20. These regulators have been respectively generally indicated by numbered dotted enclosures on the drawing. The main regulator governs the operation of both the air and fuel regulators as will be described below. The air regulator controls the amount of air supplied to the tip jets 4 by means of butterfly valves 21 and 22 which are respectively located in the air ducts 9 and 10. The fuel regulator controls the rate of fuel flow by controlling the displacement of the variable displacement pump 14.

Main regulator 18 includes a tachometer generator 23 which is driven by the helicopter rotor through a shaft shown schematically as 24 and a pinion gear 25 which meshes with a rotatable gear 26 on the rotatable portion of the helicopter rotor hub 12. The generator 23 supplies a voltage and current in accordance with the rotor speed by means of windings 27. The output of generator 23 is rectified by rectifiers 28 and supplied to a circuit including a speed-setting rheostat 29, a main winding 30 on a control solenoid 31, a connection 32 to an air regulator follow-up potentiometer 33, and a connection 34 to a main regulator potentiometer 35. The solenoid 31, when main solenoid winding 30 is energized, is pulled downwardly against the force of a tension spring 36, and the solenoid 31 thereby positions a hydraulic servo-valve 37 which in turn controls the position of a power piston 38. As will be described below, when the power piston 38 moves upwardly, both the air and fuel supplied to the tip jets 4 will generally be increased and vice versa.

A control shaft 39 of power piston 38 includes a gear rack 40 which meshes with a pinion gear 41. Pinion 41 is shown to have a shaft 42 which is schematically shown to be connected to a cam 43 and the rotatable slider 44 of potentiometer 35. Slider 44 therefore moves in accordance with the movements of the power piston 38 and the output of the main regulator. Potentiometer 33 in the air regulator 19 also has a sliding contact 45 which is movable in accordance with air regulator output. These movable center contacts 44 and 45 of potentiometers 35 and 33 are inter-connected through a circuit including a stabilizing winding 46 on solenoid 31, a capacitor 47 and a parallel connected combination of a rectifier 48 and a resistor 49.

It will be seen that upon movement of either the main regulator or the air regulator, changing the positions of movable potentiometer contacts 44 or 45, the potential between contacts 44 and 45 will be changed. This change in potential will require a change in the charge of capacitor 47 with a consequent capacitor charge changing current flow in this circuit. The capacitor charge changing current, in flowing through the stabilizing winding 46 of solenoid 31, will modify the operation of solenoid 31. The circuit is arranged so that the energization of the stabilization winding 46 is such as to oppose the movement of solenoid 31 which initially gave rise to the detected movement of either the main regulator or the air regulator. Thus the circuit including stabilization winding 46 serves to stabilize the main regulator 18, as well as the entire control system, as will be apparent from the following description, to prevent "hunting" when requirements for changes in powerplant output are suddenly imposed. The rectifier 48 effectively short-circuits the resistance 49 for one direction of capacitor charge current flow to provide a relatively "stiff" and powerful stabilization operation for one direction of movement of the regulators. The rectifier remains non-conductive to limit the charge current of the opposite polarity by the resistance of resistor 49 to provide a relatively reduced stabilization effect. The reason for this polarity controlled dual response stabilization circuit will be more fully set forth below.

Also shown on solenoid 31 is an anticipating winding 50 which is connected for energization through a circuit including a capacitor 51 and a slidable contact 52 of a potentiometer 53. Potentiometer 53 is connected across the output circuit of the tachometer generator 23. Movement of the sliding contact 52 causes a change in the potential across the winding 50 and capacitor 51 which again causes a capacitor charge changing current flow to modify the operation of solenoid 31. Sliding contact 52 is connected for movement by a collective pitch control lever 54 by which the helicopter operator can change the pitch of all of the rotor blades simultaneously to either increase or decrease the lifting effect of the rotor. Movement of the pitch control lever 54 therefore results in load fluctuation on the powerplant and resulting powerplant and rotor speed fluctuations which require speed governing operation of the regulators 18, 19, and 20. The circuit including anticipating winding 50 and capacitor 51 is therefore arranged so that current flow in this circuit in response to movement of control 54 and sliding contact 52 is in such a direction as to cause movement of solenoid 31 in anticipation of a rotor speed change which would ultimately be detected and corrected by the speed-responsive circuit and the main solenoid winding 30. This speed change anticipation circuit serves to minimize actual rotor speed change fluctuations and to permit very rapid response of the helicopter to the operator's movement of the collective pitch control lever 54.

Hydraulic control fluid under pressure is supplied to servo-piston 37, and other hydraulic control apparatus to be described below at inlet ports marked "P" from a pump 55 which may be driven from the helicopter rotor through a drive pinion 56. The output pressure of fluid from the pump 55 may be regulated by an over pressure relief valve 57 and the fluid which is used in the control system may be passed through a filter 58 to an outlet conduit 59, the terminal end of which is marked "P" with an arrow indicating outward fluid flow. Hydraulic control fluid is supplied to the pump 55 from a sump (not shown) through an inlet conduit 60 having the source of the fluid indicated as the sump by "S." At each of the hydraulic control cylinders described above, and to be described below, "P" is used to indicate hydraulic fluid under pressure from the hydraulic pump 55 and "S" is used to indicate a connection to the hydraulic fluid sump, with arrows to indicate directions of fluid flow in every case.

The hydraulic pressure fluid line 59 is also connected by a line 60 to a rotating, intermittently opened and closed valve 61 which may be referred to as a "chopper valve." The chopper valve 61 may be rotated by a gear 62 and pinion 63 from the shaft of pump 55. The outlet to chopper valve 61 is connected to a spring-biased pressure-responsive piston 64 and to temperature-responsive valves 65 and 66 respectively located in the tailpipes of gas turbines 7 and 8. The temperature-responsive valves 65 and 66 may be of the differential expansion actuated type in which, for instance, the expansion of a nickel chromium alloy metal tubing may be compared with the relatively stable dimension of a quartz rod to cause opening of either valve when a certain maximum gas turbine discharge temperature is exceeded, but maintaining the valves closed under all other conditions. It will be apparent that although only one valve is shown for each gas turbine, a number of such temperature-responsive valves might be added to the system for each turbine. When none of these temperature-responsive valves is open, the full hydraulic fluid pressure of the pump 55 is transmitted into the system including piston 64 and valves 65 and 66, which may be hereinafter referred to as the gas turbine over-temperature control. When this full pressure is maintained, the hydraulic fluid pressure is transmitted through the central passage 67 of the hydraulic piston 64, through the T-shaped termination 68 of that passage into an inner chamber 69 between a cylinder sleeve 70 (which is reciprocable) and a stationary piston 71. This pressure causes reciprocable sleeve 70 to rise, compressing the spring 72.

If any of the valves 65 or 66 open to permit the hydraulic fluid in the gas turbine over-temperature system to return to the sump, the pressure in the system will be lowered, permitting the cylinder sleeve 70 of control piston 64 to be lowered under the pressure of spring 72. This lowered position of sleeve 70 will cause an increase in the flow of compressed air through the gas turbines, as will be more fully described below. The lowered pressure in the gas turbine over-temperature control system and the lowered position of sleeve 70 will be maintained since the chopper valve 61 limits the rate of flow of pressurized hydraulic fluid from the conduit 60. The chopper valve 61 therefore performs essentially the same office as an orifice, but it is much less likely to become obstructed by any foreign material which might appear in the hydraulic fluid. In the operation of the gas turbine over-temperature control, therefore, the pressure in the control system below the chopper valve 61 will remain at the full hydraulic pump pressure when valves 65 and 66 remain closed, but will be reduced to some pressure between the full pump pressure and the sump pressure upon any appreciable opening of either of the valves 65 or 66. The control piston sleeve 70 then assumes an elevation proportional to the pressure within this system.

In addition to the gas turbine over-temperature control above described, the air regulator 19 includes a cam follower 73 which is in engagement with the cam 43, a pivoted bell crank 74 positionable by the cam 43 and cam follower 73, and a control lever 75 the right end of which is spring biased against the under side of the bell crank arm 76 by a tension spring 77. The center portion of control lever 75 is pivotally connected at 78 to a spring-biased ambient temperature-responsive bellows 79 which may be connected to an ambient temperature detecting fluid bulb 80 located at some appropriate position at the exterior of the helicopter. The left end of control lever 75 is arranged to engage a pin 81 on a downward extension 82 of a servo lever 83. The right end of the servo lever 83 may be arranged with a fork to engage the lower surface of the cylinder sleeve 70 of the gas turbine over-temperature control piston 67. The servo lever 83 is pivotally connected to the shaft 84 of a servo piston 85 which is biased upwardly by a spring 86. The servo lever 83 is also pivotally connected at its left end 86a to the shaft 87 of a power piston 88. Servo piston 85 is hydraulically connected to control the position of power piston 88 and suitable orifices as shown at 89 and 90 may be included in these connections to limit the rate of movement of power piston 88 and to thereby assist in stabilization of air regulator operation.

The power piston shaft 87, which is the output shaft of the air regulator 19, extends downwardly to position the movable potentiometer contact 45, as mentioned above. Near its lower terminal end, the shaft 87 also includes gear racks 91 and 92 which are respectively arranged by connection through pinions 93 and 94, connecting rods 95 and 96, and bell crank levers 97 and 98 to position the butterfly valves 21 and 22 of the gas turbines 7 and 8 to thereby control the amount of compressed air supplied from the turbines to the tip jets 4 of the helicopter rotors 3. It will be seen that manual levers 99 and 100, which are connected to position additional gear racks 101 and 102, may also be employed to individually adjust the butterfly valves 21 and 22 regardless of the position of the air regulator shaft 87. The maximum travel of air regulator output shaft 87 is limited so that the air regulator alone can in no case completely close the butterfly valves 21 and 22 to cut off tip jet air and tip jet combustion during flight. The final closing operation, when desired, as in starting or stopping must be performed by the manual valve adjustment levers 99 and 100.

Operation of the air regulator 19 in response to movement of the main regulator output shaft 39 is as follows: If the shaft 39 moves upwardly, the pinion 41 and cam 43 move in a clockwise direction to cause rotation of bellcrank 74 in a counterclockwise direction to depress the right end of control lever 75 about the pivot point 78 causing upward movement of the left end of control lever 75. Assuming that the gas turbine over-temperature control piston cylinder sleeve 70 is positioned upwardly out of engagement with the servo lever 83, upward movement of the left end of control lever 75 will permit upward movement of the servo lever 83 under the influence of compression spring 86 and this upward movement causes opening of servo valve piston 85 to permit flow of hydraulic control fluid to move the hydraulic power piston 88 and the associated air regulator output shaft 87 downwardly to cause a simultaneous opening movement of the air regulating butterfly valves 21 and 22 to thus increase the air supplied to the tip jets 4.

As mentioned above, fuel for the tip jets 4 is pumped by a variable displacement fuel pump 14 from the fuel reservoir 15. The fuel regulator 20 controls the amount of fuel supplied through the pump 14 by controlling the displacement of the pump. An excess of fuel pressure supplied by the pump is avoided by provision of an over-pressure relief valve 103 which is connected between the pump input and output lines.

The variable displacement pump 14 may be of a type in which the displacement is varied in accordance with the tilting action of a swash plate 104, which in turn is controlled by a piston within the pump rotor (not shown), the position of which is controlled by a control pressure in a conduit 105. The pressure of the hydraulic fluid in conduit 105 is in turn controlled by a pump relay 106, which may be a hydraulic servo piston. A follow-up position indication of the pump displacement is fed into the pump relay 106 by means of a feed-back lever 107 which positions a relay sleeve 108 in accordance with the tilting of the swash plate 104. A variable displacement pump and pump relay combination of the above type is more fully disclosed and claimed in a patent application by Donald E. Garr and Martin A. Edwards, Serial No. 718,580, filed December 26, 1946, now Patent No. 2,709,449, for a Control Mechanism for Variable Delivery Positive Displacement Pump, and assigned to the same assignee as the present application. A fuel flow rate indication is supplied to the pump relay 106 in terms of a hydraulic pressure applied at a piston 109 through a conduit 110 from a servo valve 111 which is positionable by a pair of bellows 112 and 113. Bellows 112 is connected to an orifice 114 of the fluid conduit 13 and bellows 113 is connected to a straight portion to give a Venturi flow measurement.

Another pressure signal is also supplied to the pump relay 106 in opposition to the pressure derived from conduit 110 throught the conduit 115 from another hydraulic servo 116. The servo 116 is biased to the left by the hydraulic pressure of the fluid within the servo and to the right by a lever 118 which is fulcrumed on a roller 119 and biased against this fulcrum 119 by a lever 120. The lever 120 is positioned by a bellows 121 which is connected through a conduit 122 to detect and measure the air pressure within the hub 12 as an indication of the amount of air being delivered to the tip jets 4 of the helicopter rotors 3. Another bellows 123 is connected in opposition to bellows 122 but is open to the atmosphere through an open conduit 124 and is incorporated primarily as a balance for the fellows 121.

The vertical position of the fulcrum roller 119 is controllable by the output shaft 39 of the main regulator 18 through a compression spring 125 (to compensate for overtravel of shaft 39) and a shaft 126. Downward movement of the shaft 126 is resisted by another compression spring 127, which is compressed between a fixed stop 128 and an arm 129 which is integral with the shaft 126. The limits of vertical movement of the roller 119 are controllable by a lower limit stop 130 which is adjustable and is engaged by the arm 129 at the lower limit of travel and an upper limit stop 131, which consists of a bolt extending through the fixed member 128, the compression spring 127 and an opening in the arm 129.

It will be observed that upward movement of the main regulator output shaft 39 therefore can cause simultaneous increases in both the air and fuel supplied to the tip jets, the fuel flow being increased both because of the increased air flow as detected by the air pressure-responsive bellows 121 and because of the increase in the fuel air ratio obtained by movement of the roller fulcrum 119.

As pointed out above, the circuit for the stabilization winding 46 of main control solenoid 31 includes a rectifier 48 to give different stabilization effects dependent upon the direction of movement of the main regulator 18 and the air regulator 19. This rectifier 48 is connected to rectify a stabilization winding current, shorting the parallel-connected resistor 49, to give a powerful stabilization effect to oppose too rapid closing operation of air regulator 19 so as to prevent a high rate of increase in the amount of air passing through the gas turbines. An excessive rate of increase of gas turbine air causes improper gas turbine operation. Rapid opening of the air regulator 19 and the butterfly valves 21 and 22 to decrease turbine air has less deleterious effect; therefore, the rectifier 48 is poled in such a direction that it blocks capacitor charge changing current for the opening direction of operation. Consequently, the stabilization circuit energization may be relatively weak for the opening direction of operation.

The ambient temperature detection system including bellows 79 and bulb 80 modifies the operation of the air regulator by raising and lowering pivot 78, permitting more air to be supplied to the tip jets for a low ambient temperature and less air for a high ambient temperature. Also, the gas turbine overtemperature control system may override the air flow demanded by the movement of the main regulator by depressing the right end of the servo lever 83 independently of movement of the control lever 75 to limit the amount of air supplied to the tip jets 4 in order to permit a greater volume of air to continue through the gas turbines to lower the gas turbine operating temperature. Regardless of these additional factors, which may modify the operation of the air regulator, the main regulator may still regulate the amount of fuel supplied to the tip jets in terms of fuel air ratio within predetermined limits by movement of the roller fulcrum 119.

The gas turbines 7 and 8 are preferably aligned on the aircraft so that the tailpipes discharge the turbine gases in a direction to afford some jet propulsion effect to the helicopter in addition to the lift afforded by the rotors. The gas turbine overtemperature control, which may reduce the air flow to the tip jet nozzles, therefore does not necessarily reduce the forward propulsion efficiency of the aircraft, for the air which is denied to the tip jet nozzles is supplied to the gas turbines and therefore is available to provide additional reaction propulsion at the gas turbine nozzles.

It is believed that the above-described control system provides for a maximum in performance of the apparatus in which the powerplant is to be installed, while also permitting a maximum of protection, for the powerplant and for the apparatus, against injury due to improper operation. By preventing fuel delivery to the tip jets 4 from exceeding a predetermined ratio of the tip jet air, the tip jet temperature is kept from exceeding a desired maximum without the necessity of a difficult direct measurement of tip jet temperature.

What we claim as new and desire to secure by Letters Patent of the United States is:

1. In a control system for a rotor tip jet propelled helicopter having a plurality of gas turbines driving compressors connected to supply tip jet combustion air, a main regulator continuously positionable responsive to rotor speed, an air regulator positionable responsive to the main regulator position, said main regulator including means momentarily responsive to change in the collective pitch of said helicopter rotor and stabilizing means responsive to movements of said main and air regulators, said stabilizing means having greater momentary stabilization response for respective movements of said main and air regulators in one direction than for movements in the other direction, ambient temperature measuring means connected and arranged for modifying the positioning of said air regulator, maximum temperature limiting means for controlling the position of said air regulator independently of other regulating means for limiting the operating temperature of said gas turbines, pressure responsive means connected to said gas turbine compressors for measuring the air flow to said tip jets in terms of air pressure, a fuel regulator connected to said pressure responsive means for regulating the flow of fuel proportionally to the measured air flow, said fuel regulator including a control lever having a fulcrum variably positioned by said main regulator to control the ratio of fuel to air supplied to the tip jets in response to movement of said main regulator.

2. In a control system for a rotatably mounted reaction powerplant having a separate source of compressed combustion air, a regulator for simultaneously varying the amount of combustion air and the fuel-air ratio including a tachometer generator connected for measurement of the speed of rotation of the mounting of said powerplant, a spring-biased control solenoid having a main winding energized from said tachometer generator, a stabilization circuit including a stabilizing winding on said solenoid, a capacitor, a parallel-connected rectifier and resistor combination and a first potentiometer connected to said regulator to change the voltage across said stabilization circuit upon movement of said regulator to cause a capacitor charge-changing stabilization current in said stabilization winding in a direction to oppose the regulator movement, said rectifier being conductive to shunt said resistor for a first direction of movement and non-conductive to restrict said stabilization current to said resistor for the other direction of movement to provide a stronger stabilization effect for the first direction of movement than for the second, a power change anticipation circuit including a capacitor, a second potentiometer, and an anticipation winding on said solenoid, a power plant load control lever, said second potentiometer having a sliding contact connected to said lever for changing the voltage across said anticipating circuit upon movement thereof to provide a capacitor charge change current in said anticipating winding to move said solenoid to substantially anticipate the solenoid movement which would otherwise occur in response to a change in the speed of the powerplant due to the change in powerplant load.

3. In a control for a plurality of gas turbine power plants having compressors connected as sources of compressed air for a separate reaction motor, means for simultaneously regulating the portion of gas turbine compressor air supplied to the separate reaction motor from each of the gas turbine power plants, gas turbine over-temperature detection means connected to modify the operation of said regulating means to limit the amount of air supplied to the separate reaction motor to thereby limit the maximum temperature of the gas turbines, ambient temperature detection means connected to modify the operation of said regulating means to limit the amount of said air in accordance with ambient temperature, and speed responsive means connected to said regulating means for controlling the amount of said air in accordance with the speed of the separate reaction motor.

4. In a helicopter having separate reaction motors for each helicopter rotor blade and common sources of fuel and pre-compressed combustion air for all of said reaction motors, means for measuring the speed of said helicopter rotor and for limiting the amount of combustion air from said source in accordance with said speed measurement, means for measuring the amount of air supplied to said motors for controlling the amount of fuel supplied to said motors in an adjustable ratio to the amount of said air, and means connected for actuation from said speed measuring means for adjusting said ratio.

5. A control system for a thermal powerplant including powerplant speed responsive means for controlling the amount of combustion air for the powerplant, air flow volume responsive means connected for response to the volume of air supplied to the powerplant for controlling the amount of fuel supplied to the powerplant, a connection from said speed responsive means to said air flow volume responsive means for modifying the control of said air flow volume responsive means, a powerplant load control device, a connection from said device to said speed responsive means for modifying the operation of said speed responsive means to temporarily anticipate speed changes which would otherwise occur upon operation of said device.

6. In a control system for a thermal powerplant having auxiliary apparatus for the supply of combustion air, means responsive to the speed of the powerplant, means connected for control by said speed responsive means for regulating the amount of combustion air supplied to the powerplant, ambient temperature responsive means connected to modify the operation of said air regulating means, means responsive to an operating condition of the auxiliary apparatus for modifying the operation of said air regulating means, combustion air flow responsive means for controlling the amount of fuel supplied to the powerplant, a connection from said speed responsive means to modify the operation of said air flow responsive means, means for varying the load on the powerplant, a connection from said load varying means to said speed responsive means for momentarily modifying the operation of said speed responsive means upon actuation of said load varying means to anticipate and substantially prevent speed variations which would otherwise occur upon actuation of said load varying means.

7. In a control system for a rotor tip jet propelled helicopter including a plurality of gas turbines having compressors connected to supply tip jet combustion air, a main regulator positionable responsive to rotor speed, an air regulator positionable responsive to the main regulator position, said main regulator including stabilizing means responsive to movements of said main and air regulators and having greater stabilization response for respective movements of said main and air regulators in one direction than for movements in the other direction, pressure responsive means connected to the gas turbine compressors for measuring the air flow to the tip jets in terms of air pressure, and a fuel regulator connected to said pressure responsive means for regulating the flow of said fuel proportionally to said measured air flow.

8. In a control system for a thermal powerplant having auxiliary apparatus for the supply of combustion air, means responsive to the speed of the powerplant, means connected for control by said speed responsive means for regulating the proportions of combustion air supplied to the powerplant and retained by the auxiliary apparatus, means responsive to an operating condition of the auxiliary apparatus for modifying the operation of said air regulating means, power plant combustion air flow responsive means for controlling the amount of fuel supplied to the powerplant, a connection from said speed responsive means to modify the operation of said air flow responsive means, means for varying the load on the powerplant, a connection from said load varying means to said speed desponsive means for momentarily modifying the operation of said speed responsive means upon actuation of said load varying means to anticipate and substantially prevent speed variations which would otherwise occur upon actuation of said load varying means.

9. In a control system for a thermal powerplant, means responsive to the speed of the powerplant, means connected for control by said speed responsive means for regulating the amount of combustion air supplied to the powerplant, ambient temperature responsive means and manual means connected to independently modify the operation of said air regulating means, combustion air flow responsive means for controlling the amount of fuel supplied to the powerplant, a connection from said speed responsive means to modify the operation of said air flow responsive means, means for varying the load on the powerplant, a connection from said load varying means to said speed responsive means for momentarily modifying the operation of said speed responsive means upon actuation of said load varying means to anticipate and substantially prevent speed variations which would otherwise occur upon actuation of said load varying means.

10. In a control system for a thermal powerplant having auxiliary apparatus for the supply of combustion air, means responsive to the speed of the powerplant, means connected for control by said speed responsive means for regulating the amount of combustion air supplied to the powerplant, ambient temperature responsive means and manual means connected to independently modify the operation of said air regulating means, means responsive to an operating condition of the auxiliary apparatus for modifying the operation of said air regulating means, combustion air flow responsive means for controlling the amount of fuel supplied to the powerplant, a connection from said speed responsive means to modify the operation of said air flow responsive means, means for varying the load on the powerplant, a connection from said load varying means to said speed responsive means for momentarily modifying the operation of said speed responsive means upon actuation of said load varying means to anticipate and substantially prevent speed variations which would otherwise occur upon actuation of said load varying means.

11. A control system for a rotor tip jet propelled helicopter including a main regulator positionable responsive to rotor speed, a fuel regulator including a control lever having a fulcrum variably positioned to control the ratio of fuel to combustion air in response to movement of said main regulator, a rotor blade collective pitch control, a connection from said pitch control to said main regulator for temporarily modifying the operation thereof upon movement of said pitch control to anticipate and substantially prevent speed variations which would otherwise occur upon pitch change.

12. A control system for a rotor tip jet propelled helicopter including a main regulator positionable responsive to rotor speed, an air regulator positionable responsive to the main regulator position, said main regulator being stabilizable responsive to movements of said main and air regulators, greater stabilization response being obtained for movements of said main and said air regulators in one direction than for movements in the other direction, a fuel regulator for controlling the amount of fuel supplied to the tip jets including a control lever having a fulcrum variably positioned to control the ratio of fuel to air in response to movement of said main regulator.

13. A control system for a thermal power plant having auxiliary apparatus for supplying combustion air comprising power plant speed responsive means, means connected to said speed responsive means for regulating the combustion air, means responsive to a maximum permissible temperature of the auxiliary apparatus connected for modifying the operation of said air regulating means, manually operable means connected to modifying the operation of said air regulating means, and means connected for response to said speed responsive means for regulating powerplant fuel.

14. A control system for a thermal powerplant having auxiliary apparatus for supplying combustion air comprising power plant speed responsive means, means connected to said speed responsive means for regulating the combustion air, means responsive to an operating condition of the auxiliary apparatus connected for modifying the operation of said air regulating means, ambient temperature responsive means and manually operable means connected to independently modify the operation of said air regulating means, means connected to said speed responsive means for regulating powerplant fuel, a powerplant load control device, means connected between said device and said speed responsive means for temporarily modifying the operation of said speed responsive means to anticipate and substantially prevent speed fluctuations due to load changes by said device.

References Cited in the file of this patent

UNITED STATES PATENTS

| | | |
|---|---|---|
| 2,095,991 | Lysholm | Oct. 19, 1937 |
| 2,205,625 | Mader | June 25, 1940 |
| 2,281,987 | Oswald | May 5, 1942 |
| 2,409,177 | Allen et al. | Oct. 15, 1946 |
| 2,428,531 | Schorn | Oct. 7, 1947 |
| 2,434,726 | Udale | Jan. 20, 1948 |
| 2,457,595 | Orr, Jr. | Dec. 28, 1948 |

(Other references on following page)

UNITED STATES PATENTS

| | | |
|---|---|---|
| 2,457,936 | Stalker | Jan. 4, 1949 |
| 2,503,048 | Ifield | Apr. 4, 1950 |
| 2,511,348 | Kittler | June 13, 1950 |
| 2,514,749 | Dobbins | July 11, 1950 |
| 2,517,150 | Webb | Aug. 1, 1950 |
| 2,521,244 | Moore, Jr. | Sept. 5, 1950 |
| 2,540,190 | Doblhoff | Feb. 6, 1951 |
| 2,545,703 | Orr, Jr. | Mar. 20, 1951 |
| 2,618,927 | Chandler | Nov. 25, 1952 |

FOREIGN PATENTS

| | | |
|---|---|---|
| 561,932 | Great Britain | June 12, 1944 |
| 627,117 | Great Britain | July 28, 1949 |

OTHER REFERENCES

Publication: "Flight," article, "The Pressure-Jet Helicopter," pgs. 672–674, June 9, 1949.